(12) United States Patent
Weber et al.

(10) Patent No.: US 7,296,105 B2
(45) Date of Patent: Nov. 13, 2007

(54) METHOD AND APPARATUS FOR CONFIGURING AN INTERCONNECT TO IMPLEMENT ARBITRATION

(75) Inventors: Wolf-Dietrich Weber, San Jose, CA (US); Drew E. Wingard, San Carlos, CA (US)

(73) Assignee: Sonics, Inc., Mountain View, CA (US)

( * ) Notice: Subject to any disclaimer, the term of this patent is extended or adjusted under 35 U.S.C. 154(b) by 344 days.

(21) Appl. No.: 10/678,380

(22) Filed: Oct. 3, 2003

(65) Prior Publication Data

US 2005/0076125 A1   Apr. 7, 2005

(51) Int. Cl.
*G06F 15/16* (2006.01)
(52) U.S. Cl. .................. 710/241; 710/243; 710/316; 709/241; 709/226
(58) Field of Classification Search ........ 710/240–244, 710/112–125, 200, 309, 113–119; 709/227–229, 709/241; 370/447, 461–462
See application file for complete search history.

(56) References Cited

U.S. PATENT DOCUMENTS

| | | |
|---|---|---|
| 5,274,783 A | 12/1993 | House et al. |
| 5,388,245 A | 2/1995 | Wong |
| 5,754,800 A | 5/1998 | Lentz et al. |
| 5,832,278 A | 11/1998 | Pham |
| 5,845,097 A | 12/1998 | Kang et al. |
| 5,933,610 A | 8/1999 | Chambers et al. |
| 5,948,089 A | 9/1999 | Wingard et al. |

(Continued)

FOREIGN PATENT DOCUMENTS

EP    0374 521    6/1990

(Continued)

OTHER PUBLICATIONS

Goossens, Kees, et al., "Guaranteeing the Quality of Services in Networks on Chip," Philips Research Laboratories, Eindhoven, The Netherlands Technical University of Eindhoven, Eindhoven, The Netherlands, In Axel Jantsch and Hannu Tenhunen, editors, Networks on Chip, Kluwer, Chapter 4, Mar. 2003, pp. 61-82.

(Continued)

*Primary Examiner*—Khanh Dang
*Assistant Examiner*—Raymond N Phan
(74) *Attorney, Agent, or Firm*—Blakely, Sokoloff, Taylor & Zafman LLP

(57) ABSTRACT

Various methods and apparatuses are described in which an interconnect couples to a plurality of initiator network resources and a plurality of target network resources. The interconnect may include a first stage of circuitry, a second stage of circuitry, and an arbitration controller. The first stage of circuitry receives incoming transactions from the plurality of initiator network resources. The second stage of circuitry passes outgoing transactions to the plurality of target network resources connecting to the interconnect. The arbitration controller arbitrates transactions from the plurality of initiator network resources destined to one or more of the target network resources. The target network resources supply their availability to service a transaction to the arbitration controller. The arbitration controller implements an arbitration policy that filters out transactions from the arbitration process those transactions from initiator network resources destine to target network resources that are currently not available to service a transaction.

21 Claims, 5 Drawing Sheets

U.S. PATENT DOCUMENTS

| | | | |
|---|---|---|---|
| 5,949,789 A * | 9/1999 | Davis et al. | 370/452 |
| 6,012,116 A | 1/2000 | Aybay et al. | |
| 6,021,450 A | 2/2000 | Yoshizawa et al. | |
| 6,029,219 A * | 2/2000 | Michizono et al. | 710/111 |
| 6,092,158 A | 7/2000 | Harriman et al. | |
| 6,141,713 A | 10/2000 | Kang | |
| 6,145,040 A | 11/2000 | LaBerge et al. | |
| 6,175,886 B1 | 1/2001 | Usami | |
| 6,182,183 B1 | 1/2001 | Wingard et al. | |
| 6,330,225 B1 | 12/2001 | Weber et al. | |
| 6,493,776 B1 | 12/2002 | Courtright et al. | |
| 6,532,509 B1 | 3/2003 | Wolrich et al. | |
| 6,578,117 B2 | 6/2003 | Weber | |
| 6,738,839 B2 * | 5/2004 | Sinha | 710/39 |
| 6,763,415 B1 | 7/2004 | Tischler | |
| 6,782,441 B1 | 8/2004 | Nguyen et al. | |
| 6,823,411 B2 | 11/2004 | Hofmann et al. | |
| 6,848,017 B2 * | 1/2005 | MacEachern et al. | 710/317 |
| 6,898,649 B2 | 5/2005 | Goudie | |
| 6,970,454 B1 * | 11/2005 | Purcell et al. | 370/355 |
| 6,973,520 B2 * | 12/2005 | Drerup et al. | 710/110 |
| 6,976,106 B2 | 12/2005 | Tomlinson et al. | |
| 6,976,109 B2 * | 12/2005 | Shenderovich | 710/243 |
| 7,013,357 B2 * | 3/2006 | Murdock et al. | 710/240 |
| 7,054,969 B1 * | 5/2006 | Phelps et al. | 710/113 |
| 7,149,829 B2 | 12/2006 | Weber et al. | |
| 7,165,094 B2 | 1/2007 | Weber et al. | |
| 2001/0010066 A1 | 7/2001 | Chin et al. | |
| 2002/0138677 A1 | 9/2002 | Brock et al. | |
| 2002/0169935 A1 | 11/2002 | Krick et al. | |
| 2003/0074520 A1 | 4/2003 | Weber | |
| 2003/0156597 A1 * | 8/2003 | Eberle et al. | 370/447 |
| 2004/0042481 A1 | 3/2004 | Kurupati | |
| 2004/0210696 A1 | 10/2004 | Meyer et al. | |

FOREIGN PATENT DOCUMENTS

| | | |
|---|---|---|
| EP | 1 091 301 A | 4/2001 |
| WO | WO 00/29961 | 5/2000 |

OTHER PUBLICATIONS

Scroi, M., et al., "Addressing the System-on-a-Chip Interconnect Woes Through Communication-Based Design," University of California at Berkeley, Princeton University, DAC 2001, Jun. 18-22, 2001, Las Vegas, Nevada, (7 pgs).

Telecommunications Protocol and Design by Spragins (ISBN: 0-21-09290-5, Jul. 1992).

International Search Report for International Application No. PCT/US2004/010864, mailed on Jan. 18, 2005, pp. 7 total.

"Open Core Protocol Specification", OCP International Partnership, Release 1.0, 2001.

Open Core Protocol Specification, OCP International Partnership, Release 1.0, (201 pages), unknown date.

Weber, Wolf-Dietrich, "Efficient Shared DRAM Subsystems for SOCs," SonicsINC, Copyright 2001, pp. 1-6.

Wingard, Drew, "Sonics SOC Integration Architecture," Sonics, Inc., P1500 Presentation Jan. 28, 1999, pp. 1-25.

Shin, Eung S. et al., "Round-robin Arbiter Design and Generation" ISSS '02, Oct. 2-4, 2002, Kyoto, Japan, 6 pages.

* cited by examiner

METHOD AND APPARATUS FOR CONFIGURING AN INTERCONNECT TO IMPLEMENT ARBITRATION

FIELD OF THE INVENTION

Embodiments of the invention generally relate to an interconnect in a networked environment. More particularly, an aspect of an embodiment of the invention relates to an interconnect having an arbitration controller to implement an arbitration policy that minimizes power consumption.

BACKGROUND OF THE INVENTION

FIG. 1 illustrates a block diagram of a prior art bus mechanism to establish a connection path between initiator network resources to target network resources across a bus. The network may consist of various network resources that may initiate requests such as initiating network resources 1 through N, where N indicates any number. The network may also contain target network resources, which will service the requests of the initiating network resources. The target network resource may contain target network resources such as target network resources 1 through N. The system may contain a bus controller for controlling the transactions between the initiator network resource and the target network resource. FIG. 1 illustrates with dotted lines, a connection path from the first initiator network resource across the common data bus to the second target network resource.

Digital signals from the initiating network resource to the target network resource vary the voltage level on the conductive pathways to transition the voltage level from a low voltage to a high voltage and vice versa to communicate the data in the digital signal. Transitioning a set of conductors causes two things to occur when those conductive pathways transition. First, the conductive pathways must consume power to charge up from a low voltage state to a high voltage state. Next, the conductive pathways adjacent to the conductive pathways transitioning from a high voltage state to a low voltage state may incur current leakage flow through the capacitance between the neighboring lines. A small amount of leakage current flows out from the adjacent lines causing those lines to have to be recharged more often to replace the leaked charge. The more often those conductive pathways have to be recharged, the more power is consumed, and that means a lower battery life for hand held devices.

In some previous common bus techniques, when the first initiator network resource communicates a data payload across the common data bus to the second target network resource, not only will the direct pathway between the initiator and target have a voltage transition but most of the lines and pathways associated with that data bus may also transition their voltage levels at the same time. In this prior approach used by shared interconnects and buses, generally there has been little effort made to reduce voltage transitions on conductive pathways not directly involved in the transaction transfer between the initiator network resource and the target network resource.

Also, two generic types of arbitration controllers typically exist. The first type of bus controller locks the bus until a target network resource is ready to accept a transition if an initiator wins the arbitration process. With this type of arbitration controller, the overall system performance typically is reduced because all of the other network resources must wait on the target resource to be ready to service the initiator who won the arbitration process prior to getting another transaction processed across that shared interconnect. The second type of bus controller transmits the payload of information to the target network resources when an initiator network resource wins the arbitration process. If the target network resource is not ready to service the information sent across from the initiator, then the target network resource sends a retry response to the initiator. This type of bus control mechanism wastes power. The initiating network resource on every cycle may send information across the shared link. However, the transmitted information may need to be retransmitted several times before that information is actually serviced by the target network resource.

Also, in some dedicated interconnects that couple to a single initiator and a single target a form of transition filtering has been applied to the set of wires for the dedicated communication between a single initiator and a single target. However, typically these dedicated interconnects have no need for an arbitration mechanism to share the dedicated wires.

Further, some system on chip designs are beginning to suffer potential performance problems because of the physical distance traveled on the chip for a fully combinational initiation of a request and payload transmission occurring in the same cycle. For a single cycle arbitration and payload transfer, the initiator sends a request from its location on the chip to the arbitration controller. The arbitration controller conducts an arbitration of all of the requests being presented to select a winning request. The arbitration controller, from its location on the chip, sends back the response granting the request to the initiator. The initiator sends the payload of information from its location on the chip across the interconnect to the target network resource at its location on the chip. All of these steps occur in the same cycle. The signals travel a physical distance multiple times to and from the arbitration controller and once from the initiating network resource across the interconnect to a target network resource. A measurable amount of time takes place for the electrons to travel that distance. Thus, the speed of the clock clocking that particular circuit may be capped to a maximum amount so that a worst case physical distance needed to travel by the electrons across the chip can occur within a single cycle. The worst case physical distance needed to travel by the electrons across the chip can limit how fast the clock speed a particular chip may operate at.

SUMMARY OF THE INVENTION

Various methods and apparatuses are described in which an interconnect couples to a plurality of initiator network resources and a plurality of target network resources. The interconnect may include a first stage of circuitry, a second stage of circuitry, and an arbitration controller. The first stage of circuitry receives incoming transactions from the plurality of initiator network resources. The second stage of circuitry passes outgoing transactions to the plurality of target network resources connecting to the interconnect. The arbitration controller arbitrates transactions from the plurality of initiator network resources destined to one or more of the target network resources. The target network resources supply their availability to service a transaction to the arbitration controller. The arbitration controller implements an arbitration policy that filters out transactions from initiator network resources to target network resources that are currently not available to service a transaction.

BRIEF DESCRIPTION OF THE DRAWINGS

The drawings refer to embodiments of the invention in which.

Figure 1:
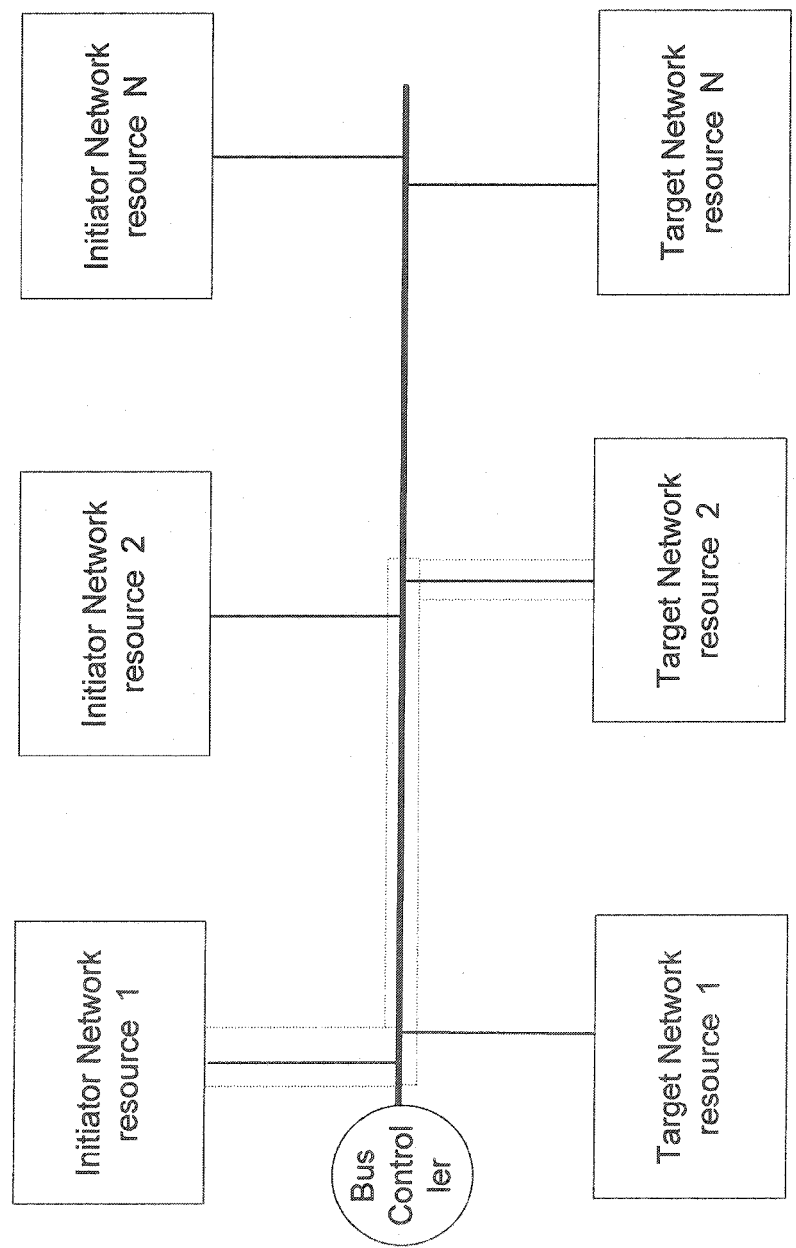
FIG. 1 illustrates a block diagram of a prior art bus mechanism to establish a connection path between initiator network resources to target network resources across a bus.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of network resources, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first initiating network resource, may be made. However, the specific numeric reference should not be interpreted as a literal sequential order but rather interpreted that the first initiating network resource is different than a second initiating network resource. Thus, the specific details set forth are merely exemplary. The specific details may be varied from and still be contemplated to be within the spirit and scope of the present invention.

In general, various methods and apparatuses are described in which one or more initiating network resources present a transaction to be serviced by an available target network resource while minimizing the power consumed by routing paths not directly involved in transaction transfer between the initiator network-resource and the target network-resource. One or more initiator network resources present a transaction, such as a request, reply, etc., to an arbitration controller on an initial cycle. The arbitration controller determines a destination associated with a target network resource for each presented transaction. The arbitration controller cross-references the presented transactions from the initiator network resources with target network resources that are currently not available to service a transaction. The arbitration controller filters out presented transactions to target network resources that are currently not available to service a transaction. The arbitration controller implements an arbitration process among the remaining presented transactions to select a presented transaction from an initiating network resource to an available target network resource that wins the arbitration. The arbitration controller may determine actions in this cycle that will take effect in next cycle by storing the results of the arbitration process in control flip flops. The arbitration controller configures segmentation of the pathways in the shared interconnect so that the control flip flops store the control information resulting from the arbitration process. In the next cycle, the arbitration controller establishes a connection with the control signals in the interconnect between the initiator network resource and the available target network resource that won the arbitration. The arbitration controller configures segments of the pathways in the interconnect path to pass the winning presented transaction from the initiator network resource to the target network resource while isolating other segments of the pathways in the interconnect not part of the transaction transfer between the initiator network-resource and the target network-resource. The arbitration controller may have a first stage of circuitry to receive incoming transactions from the plurality of initiator network resources and a second stage of circuitry to pass outgoing transactions to target network resources connecting to the interconnect.

Figure 2:
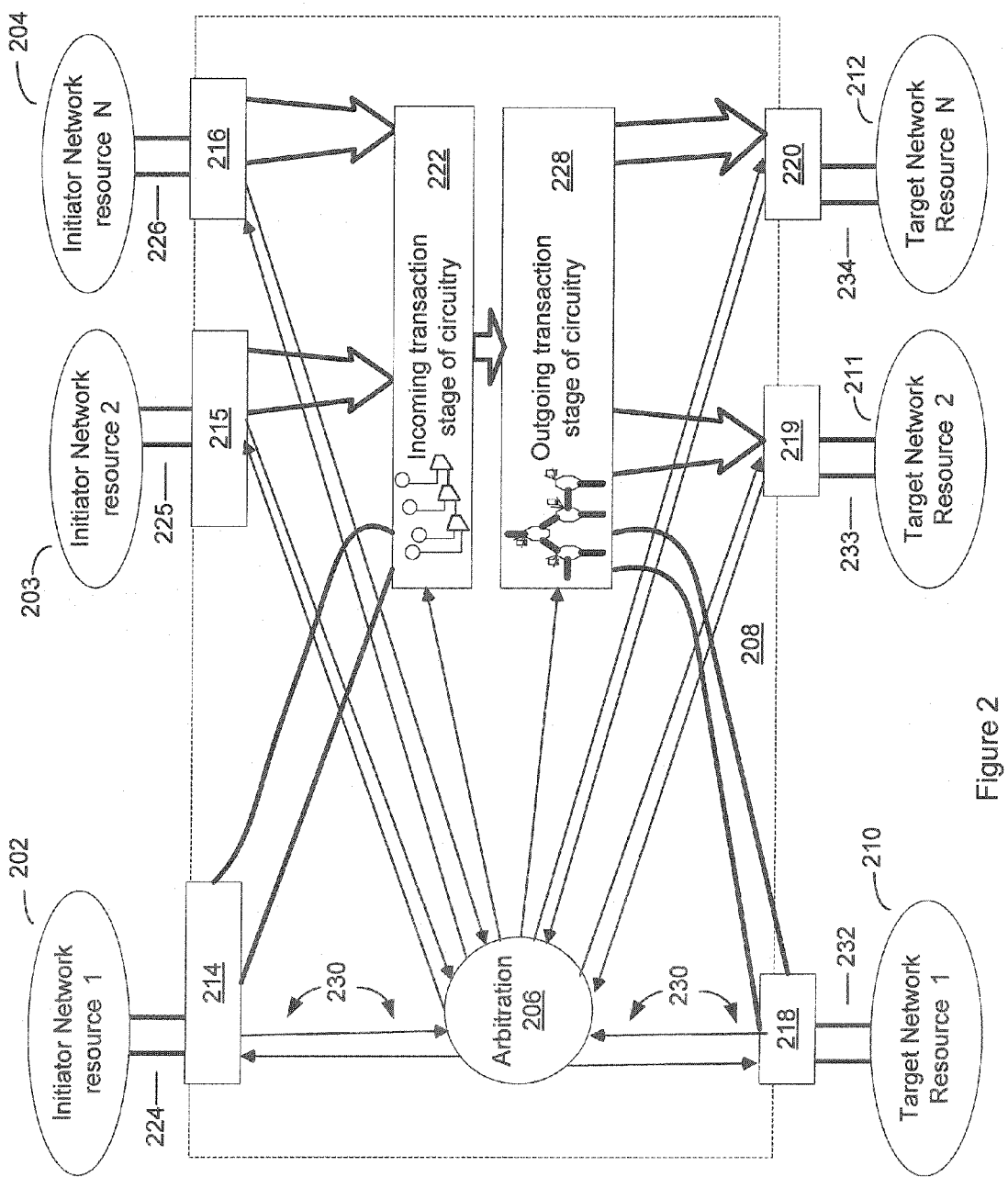
FIG. 2 illustrates a block diagram of an embodiment of a shared interconnect that has a first stage of circuitry, a second stage of circuitry, and an arbitration controller.

FIG. 2 illustrates a block diagram of a shared interconnect that has a first stage of circuitry, a second stage of circuitry, and an arbitration controller. The shared interconnect 208 may couple to a plurality of initiator network resources 202-204, such as Intellectual Property cores on a system on a chip, as well as couple to a plurality of target network resources 210-212. The networked system, such as a system on a chip, may have multiple initiator network resources, such as first initiating network resource 202 through an Nth initiator network resource 204. One or more of the network resources 202-204 on any given cycle may be presenting a request to the arbitrator 206 to use the shared bus interconnect 208 to establish a pathway between the initiating network resource and a target network resource. The plurality of target network resources 210-212 may also be Intellectual Property cores, such as processors, memories, or virtually any wholly integrated block of circuit(s) designed to accomplish a specific function for that chip. The arbitration controller 206 arbitrates transactions from the plurality of initiator network resources 202-204 destined to one or more of the target network resources 210-212.

The interconnect 208 may have any number of input terminals 214-216 and output terminals 218-220. The initiator network resources 202-204 transmit signals to the incoming transaction stage of circuitry 222 through multi-bit parallel bus lines 224-226 via the input terminals 214-216. The interconnect 208 may also include the incoming transaction stage of circuitry 222 and an outgoing transaction stage of circuitry 228. The arbitrator 206 may connect to the network resources 202-204, 210-212 through the input terminals 214-216 and output terminals 218-220. The arbitrator 206 may also connect to the incoming transaction stage of circuitry 222 and the outgoing transaction stage of circuitry 228. The arbitration controller 206 may connect to these components through single bit control lines 230. The initiator network resources 202-204 and target network resources 210-212 can send arbitration requests, flow control, etc. through the single bit control lines 230 to the arbitration control mechanism 206. The outgoing transaction stage of circuitry 228 may also connect to the target network resources 210-212 through multi-bit parallel bus lines 232-234 via the output terminals 218-220. These multi-bit bus lines 224-226, 232-234 may be, for example, 128 bits wide depending on the architecture design of the chip.

The incoming transaction stage of circuitry 222 may receive a payload of information from one or more of the plurality of initiator network resources 202-204. The incoming transaction stage of circuitry 222 may include one or more filter units and flip-flop control units to create segmented pathways in the interconnect 208. The incoming transaction stage of circuitry 222 may communicate the payload of information from the word-lines 224-226 through a segmented pathway across a common merger point to the outgoing transaction stage of circuitry 228.

The outgoing transaction stage of circuitry 228 passes the outgoing transactions to one or more of the target network resources 210-212 connecting to the interconnect 208. The outgoing transaction stage of circuitry 228 may include one or more splitter units and one or more flip-flop control units in order to create segmented pathways in the output path of the interconnect 208.

The arbitration controller mechanism 206 arbitrates transactions from the plurality of initiating network resources 202-204 destined to one or more of the target network resources 210-212. Each initiator network resource 202-204 on any given cycle may present a transaction to be arbitrated via sending a request and identifying the target with identifying target information within that request. The arbitration controller 206 implements the arbitration policy and filters out transactions from the arbitration process from initiator network resources 202-204 that have destinations to target network resources 210-212 that are currently not available to service a transaction. The arbitration controller 206 receives the arbitration request and the target information via the control lines 230. Each target network resource 210-212 sends its flow control information identifying whether it's ready to service a transaction or not, to the arbitration controller 206 via the control lines 230. After the arbitration controller 206 identifies which targets are destined to be sent a transaction, the arbitration control mechanism 206 determines whether that target network resource can currently service a transaction. If a target network resource is not ready to service a transaction, then the presented transactions destined to that target network resource are eliminated from the pool of presented transactions to be arbitrated prior to conducting the arbitration algorithm. After the filtering, the arbitrator 206 may then implement an arbitration algorithm such as a round robin, priority based, least recently serviced, or other type of arbitration algorithm. The target network resources 210-212 may provide their flow control information on a continuous basis with a signal to the arbitrator 206 letting the arbitration controller mechanism 206 know whether that target network resource can service a transaction. Alternatively, the target network resources 210-212 can relay their flow control information to the arbitration controller 206 in response to receiving a request signal from one of the initiator network resources 202-204. The arbitration controller 206 implements the arbitration policy and determines which initiator network resource of all the network resources presenting transactions on that given cycle wins the arbitration for that particular cycle.

The arbitration controller 206 establishes the segmented pathways within the interconnect 208 that establish a connection between the initiator network resource and the target network resource while isolating the pathways not involved in the transfer by sending control signals to the incoming transaction stage of circuitry 222 and the outgoing stage of circuitry 224. The arbitration controller 206 couples to the one or more filter units and splitter units to configure the connection pathway in the interconnect 208 between the initiator network resource that wins the arbitration and the corresponding target network resource that the transaction is destined to be delivered to. The configured connection pathway established by the control signals of the arbitrator 206 allows a transaction payload transfer between the initiator network resource and the target network resource while isolating other segments of the pathways in the interconnect 208 that are not part of the transaction transfer between the initiator network resource and the target network resource.

The arbitration process and payload transfer may occur in two or more separate cycles. The arbitration process occurs in an initial cycle. During the arbitration, the arbitration controller arbitrates among presented transactions that remain after the filtering process to select a winning presented transaction from a presenting initiator network resource and an available target network resource pair. On the next cycle, the payload of information transfers from the winning initiating network resource to the target network resource across merely the pathways directly involved in transaction transfer between the initiator network-resource and the target network-resource.

The arbitration unit may take in requests that include target information from the initiator network resources and flow control information signals, such as availability to service, from the target network resources. The arbitration process can make sure that requests to busy targets cannot win arbitration by taking in target information from initiator network resources and flow control information from target network resources. Some of the advantages of this approach are: the link is not blocked by requests that cannot proceed; and no power is wasted in sending requests that cannot proceed. The arbitration unit may base its arbitration decision upon the inputs and internal history it keeps about previous arbitration results. The output of the arbitration unit may be communicated to the initiator network resources via grant signals and to the target network resources via request signals. The control for the incoming and outgoing data paths may be registered by storing the control signals in the control flip flops before being applied to the splitter units, filter units and merger units of the data path, since the payload movement in the data path happens in the next cycle. An advantage of implementing the arbitration process in an initial cycle while the circuitry to receive transactions to allow the information transfer to occur in the next cycle is minimization of logic glitches within the interconnect. The registering of the control information in one cycle before using it in the next minimizes logic glitches in the incoming and outgoing data path. Further, higher clock speed operations are possible by separating the arbitration decision and actual payload movement into two distinct cycles due to the shorter total physical distance needed to be traveled by all of the signals in that single cycle.

Figure 3:
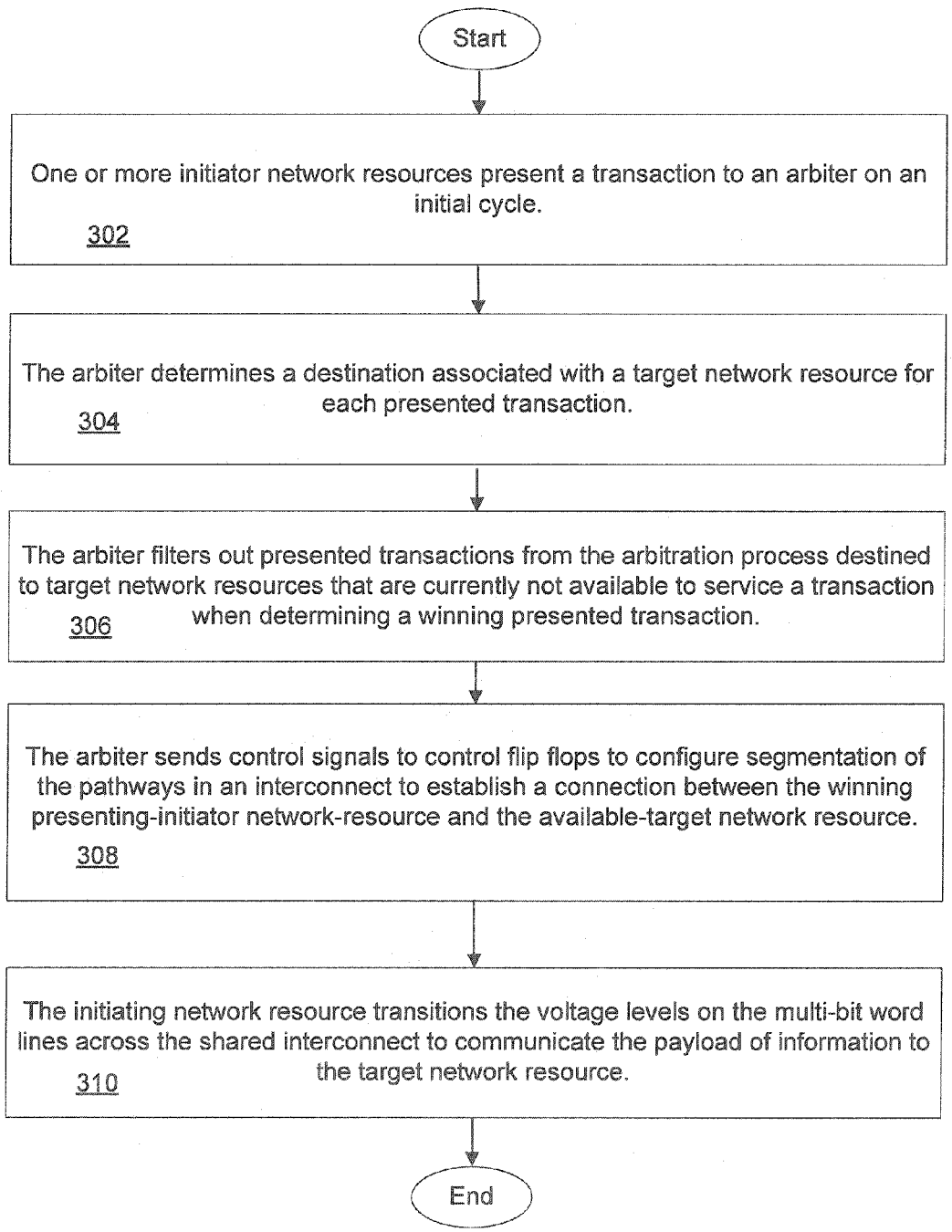
FIG. 3 illustrates a flow diagram of an embodiment of an arbitration process and a payload of information transfer between the initiating network resource and the available target network resource.

FIG. 3 illustrates a flow diagram of an embodiment of an arbitration process and a payload of information transfer between the initiating network resource and the available target network resource. The arbitrator is configured to allow one or more initiator network resources to present a transaction to be serviced by an available network resource while minimizing the power consumed by routing paths not directly involved in transaction transfer between the initiator network-resource and the target network-resource.

In block 302, one or more initiator network resources present a transaction, such as a request, reply, etc., to an arbitration controller on an initial cycle.

In block 304, the arbitration controller determines a destination associated with a target network resource for each presented transaction. The arbitration controller cross-references the presented transactions from the initiator network resources with target network resources that are currently not available to service a transaction.

In block 306, the arbitration controller filters out presented transactions from the arbitration process destined to target network resources that are currently not available to service a transaction. The arbitration controller implements an arbitration process among the remaining presented transactions to select a presented transaction from an initiating network-resource to an available-target network resource that wins the arbitration. The arbitration controller communicates to each of the initiator network resources whether that network resource won the arbitration or not.

In block 308, the arbitration controller sends control signals to control flip flops to configure segmentation of the pathways in an interconnect so that the control flip flops store the control information resulting from the arbitration process. The arbitration controller establishes a connection between the winning presenting-initiator network-resource and the available-target network resource with the control signals. The arbitration controller configures segments of the pathways in the interconnect path to pass information from the initiating network resource to the available target network resource while isolating other segments of the pathways in the interconnect not part of the information transfer between the initiator network-resource and the available target network-resource. The control signals may be stored in the control flip flops, and have their effect on the incoming and outgoing datapath in the next cycle.

In block 310, which in some embodiments occurs in the cycle after steps 302 to 308, the initiating network resource transitions the voltage levels on the multi-bit bus lines across the shared interconnect to communicate the payload of information to the target network resource. The interconnect follows a simple pipeline structure where arbitration for the interconnect occurs in one cycle and payload of information moves in the next cycle. While a new arbitration occurs, the payload of information movement resulting from the previous arbitration takes place.

Figure 4:
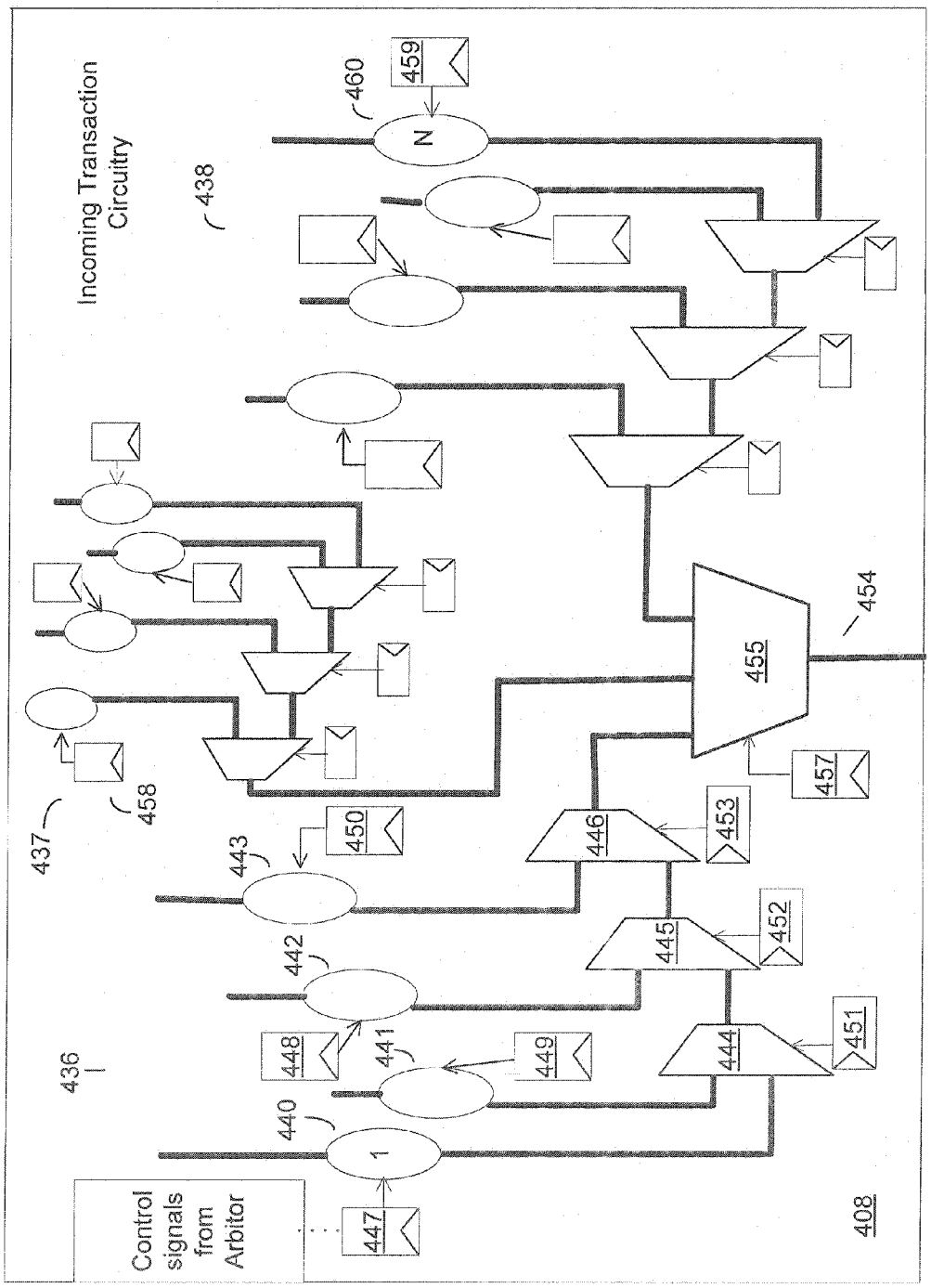
FIG. 4 illustrates a block diagram of an embodiment of an incoming transaction stage of circuitry.

FIG. 4 illustrates a block diagram of an embodiment of an incoming transaction stage of circuitry. The incoming transaction circuitry 408 may be broken up into segments for establishing pathways in the interconnect. Each segmented pathway 436-438 may contain one or more flip-flop controllers, one or more filters, and one or more merge units. All of the segmented pathways 436-438 eventually work towards a common point 454 where a merge unit 455 exists to select between the various segmented paths 436-438 to forward the transaction payload of information from an initiator network resource across to the outgoing transaction circuitry. The first segmented pathway 436 may consist of a first through a fourth filter unit 440-443, a first through a third merger unit 444-446, and a first through a seventh control flip-flop 447-453. Each filter unit 440-443 receives a transaction from an initiator network resource connected to that filter unit via the input terminal. Each filter unit 440-443 also receives a control signal via the control flip-flop 447-450 connected to that filter unit from the arbitration controller. The control signal may direct a filter unit to pass the transaction from the initiator network resource connected to that filter unit. Each merge unit receives an output of a filter unit and a control signal.

As discussed, the arbitration process and payload transfer may occur in two or more separate cycles. The arbitration process occurs in an initial cycle. During the arbitration, the arbitration controller arbitrates among presented transactions that remain after the filtering process to select a winning presented transaction from a presenting initiator network resource and an available target network resource. Further, the arbitration controller communicates to all of the initiator network resources presenting a transaction on that cycle, whether or not that particular network resource won the arbitration or not. Also, the arbitration controller sends control signals to these control flip-flops, such as the first control flip-flop 447 through the seventh control flip-flop 453. The control flip-flops 447-453 store the control information resulting from the arbitration process.

If the initiator network resource associated with, for example, the first filter unit 440 wins the arbitration process, then the control signals from the arbitration controller that are stored in the control flip-flops will be as follows. The first control flip-flop 447, the fifth control flip-flop 451, the sixth control flip-flop 452, the seventh control flip-flop 453, and the eighth control flip flop 457 receive control signals and store control signals that allow the device that couple to these flip flops to pass the incoming signal to the output of these devices. All of the other control flip-flops, such as the second to the fourth control flip flops 448, 449, 450 and the eighth control flip flop 458 to the nth control flip-flop 459 receive signals to hold or maintain their control state and thus not change the transitioning of any of the conductive pathways associated with those flip-flops. The eighth control flip-flop 457 directs the fourth merger unit 455, such as a multiplexer, on which segmented path input to pass to the output of the fourth merger unit 455.

On the next cycle, the first filter 440, and the first merge unit 444, the second merge unit 445, the third merge unit 446, and the fourth merge unit 455 sense the stored activation signal in the respective control flip flop 447, 451, 452, 453, 457 and change the voltage level of the bus lines on their output based upon the voltage level sensed on their input bus lines. The established configured connection path in the incoming stage of circuitry for the initiator network resource associated with the first filter 440 is as follows. The connection path is from the first filter 440 through the first merge unit 444 through the fourth merge unit 455 while all other segmented paths and components associated with control flip-flops maintain their current transition state. Therefore, those other pathways are all prevented from transitioning. The winning initiator network resource transmits its payload of information across this established configured pathway to the outgoing transaction circuitry in the interconnect.

Thus, the payload information transfers from the input of the first filter unit 440 and out the output into the input of the first merge unit 444. The payload information transfers from the input of the first merge unit 444 out the output of the first merge unit 444 and into the input of the second merge unit 445. The payload information transfers out the output of the second merge unit 445 into the input of the third merge unit 446 and out the output of the third merge unit 446 into the input of the fourth merge unit 455. The payload information transfers out the output of the fourth merge unit 455 to the outgoing transaction circuitry.

The wires and conductive paths associated with the second filter unit 441 to the nth filter unit 460 does not transition the voltage level on their output. Therefore, those conductive paths do not need to be recharged, nor does any leakage current occur in the conductive paths adjacent to those conductive paths because no transitioning of voltage levels occurs on those conductive paths. Thus, the interconnect merely transitions in voltage level the conductive paths to be transitioned in order to communicate the payload information from an initiator network resource to a target network resource that is ready to service that initiator network resource. The reduction of lines transitioning in voltage level and minimization of leakage current saves power expended in a battery powered device.

The filter units and other components for the other segmented pathways 437, 438 work similarly as described in the example for the first segmented pathway 436. The filter units may be composed of a logical AND gate or latch or other combination of logic components to create a filtering function. The merger unit may be composed of a multiplexer and latch or other combination of components to create a selective switch function. If the filter units set all signals to zero when the filter is turned off, the merge units can just be OR gates. Alternatively, each filter unit and merger unit may contain a latch to hold the value of the downstream output wire to the previous value.

The incoming data path may have filtering units at each input and a fan-in network of merge points linked by wires. Each filtering unit may be turned on to allow the payload of information to pass or turned off to hold its output voltage at a steady value depending on whether the corresponding initiator network resource won arbitration in the previous cycle. The merge units may be turned on in such a way that the initiator network resource's payload information can transition to the root of the fan-in network, while other portions of the fan-in network are held steady. Holding the wires of the fan-in network steady can minimize power consumption in the incoming data path. Thus the interconnect's use of segmented pathways minimizes the power consumption in passing a payload of information from the initiating network resource to the available target network resource by isolating other segments of the pathways in the interconnect not part of the payload of information transfer between the initiator network-resource and the available target network-resource. Each segmented pathway is independently controllable. The interconnect creates a network of incoming transactions to a central point and a network of outgoing transactions from the central point. Alternatively, the interconnect may also create a network of incoming transactions routed to multiple parallel bus paths within the incoming transaction circuitry and then out through the network of outgoing transactions or implement another similar architecture.

Figure 5:
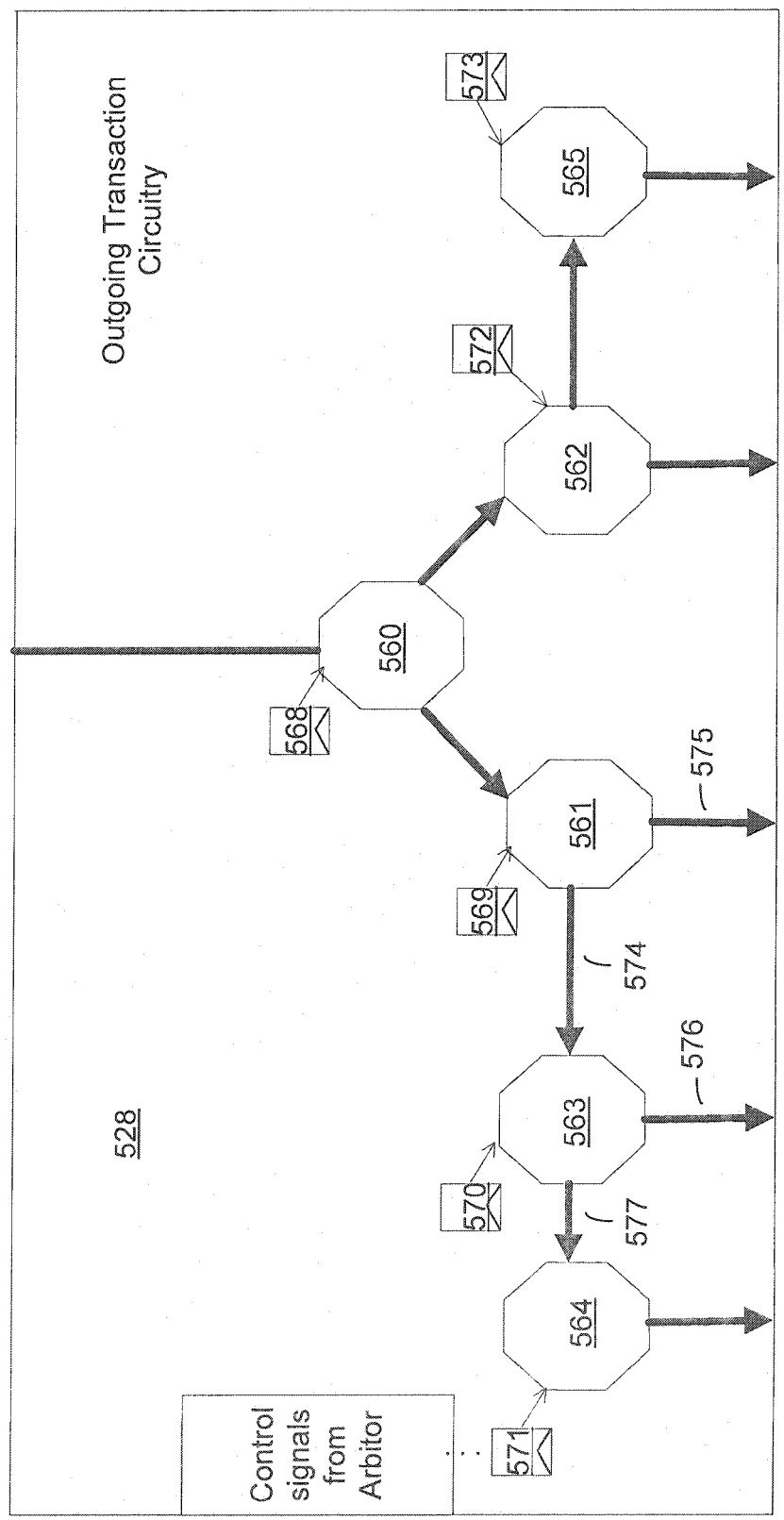
FIG. 5 illustrates a block diagram of an embodiment of an outgoing transaction circuitry.

FIG. 5 illustrates a block diagram of an embodiment of an outgoing transaction circuitry. The outgoing transaction circuitry 528 includes a plurality of splitter units 560-565 and control flip-flops 568-573 associated with each of the splitter units. Each of the control flip-flops 568-573 receives a control signal from the arbitration controller. Each of the control flip-flops 568-573 receives its control signal from the arbitration controller on the initial cycle. Each of the splitter units 560-565 receives an input signal from the bus lines of the splitter unit immediately prior to that splitter unit, except for the initial splitter unit, which receives the payload information from the output of the incoming transaction circuitry. Each of the splitter units 560-565 has two or more outputs. Each of the splitter units, except for the initial splitter unit, connects the two outputs as follows. One output connects to the output terminal and then to a particular target network resource via that output terminal. The second output connects to the next adjacent splitter unit and acts as an input for that splitter unit. Note, the splitter units could have more than two outputs or be arranged in different topologies. As indicated before the topology outgoing transaction circuitry is merely an example.

The outgoing data path has splitter units 560-565 tied together to form a fan-out network. Each splitter unit 560-565 may be controlled from arbitration results information stored in the control flip flop 568-573 to pass information through to one or none of its outgoing branches. The splitter units 560-565 can force non-active branches to zero or hold the previous value using a latch. In either case, the conductive path is again steady in voltage level on portions of the network that are not part of the active communication, thus saving power.

If, for example, the target network resource associated with the third splitter unit 563 is the ultimate destination of the transaction payload information, then the segmented path within the outgoing transaction circuitry 528 will be configured as follows. On the initial cycle, the arbitration controller sends control signals to the first control flip-flop 568, second control flip-flop 569, and third control flip-flop 570 to put control information to be stored in those control flip-flops to assert those flip-flops. The fourth, fifth, and sixth control flip-flops 571-573 receive control signals from the arbitration controller to maintain their current state or transition to not selected, if they had been active in the previous cycle.

On the next cycle, the payload information comes through the configured segmented pathways of the incoming transaction circuitry to the input of the first splitter unit 560. The payload information transfers through the first splitter unit 560 to it's output connecting to the second splitter unit 561. The second splitter unit 561 has been configured by the second control flip-flop 569 to direct the payload information out its second output 574, which connects to the third splitter unit 563. However, the second splitter unit 561 maintains the voltage levels on its first output 575, which goes to a target network resource other than the current target network resource.

The third splitter unit 563 transitions the voltage levels on its output multi-bit bus lines based on the payload information sensed on the input of the third splitter unit 563. The third control flip-flop 570 configures the third splitter unit 563 to send the payload data out the first output 576 and not out its second output 577. The control information from the third control flip-flop 570 configures the third splitter unit 563 to maintain its transition state on its second output 577. The first output 576 communicates the payload information to the current target network resource via the output terminal. The fourth, fifth, and sixth control flip-flops 571-573 cause their splitter units 562, 564, 565 to maintain both of their outputs in the same transition state that they were prior to this cycle.

Thus the segmented pathways within the interconnect make the interconnect very low in power consumption because of the limited number of conductive paths that need to be transitioned and that need to be recharged due to capacitive leakage problems. The shared interconnect has an input transaction circuitry and an output transaction circuitry having independently controllable segmented pathways within the interconnect. The conductive pathways of the interconnect may be wires, solder runs, metalization links, vias, or some other conductive pathway. The structure of the data path in the shared interconnect allows for transition filtering on all incoming and outgoing branches so that no payload wires transition unless data is actually being communicated. The network may be implemented on a system on a chip. Therefore, most of the intellectual property cores are located on that chip.

Separating the arbitration process and transmission of the payload of information into two discreet actions occurring on two or more different cycles can increase the maximum clock speed that the chip operates on. If the arbitration process and transmission of the payload of information is separated into two discreet actions occurring on two or more different cycles, only half the worst case physical distance needs to be traveled on any given cycle. On the first cycle, all the initiators may present their transactions, which will physically travel from the initiator to the arbitration controller, the arbitration controller implements the arbitration policy and communicates back to the initiator whether it has won or not won the arbitration process. On the next cycle, the winning initiator network resource transmits the payload information through the interconnect via the already configured segmented pathways to the target network resource. The electrons associated with the information payload transfer merely travel the physical distance between the initiator and the target network resource via the interconnect without any other actions needing to occur during that cycle.

Thus, the architecture of the interconnect and arbitrator may be configured for different amounts of pipelining, such as zero to any number of cycles between the time of the generation of the results of the arbitration process and when the transaction transfer occurs between the initiator network to the available-target network resource. Thus, the results of the arbitration process and a transaction transfer between the initiator network resource to the available-target network resource may occur in the same cycle.

The shared interconnect having an architecture built for splitting transactions may be very low in power consumption. The low power consumption is particularly beneficial for battery-powered handheld devices such as mobile phones and PDAs.

In an embodiment, a machine-readable medium may have stored thereon information representing the apparatuses and/or methods described herein. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. For example, the information representing the apparatuses and/or methods may be contained in an Instance, soft instructions in an IP generator, or similar machine-readable medium storing this information.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

While some specific embodiments of the invention have been shown the invention is not to be limited to these embodiments. For example, one skilled in the art will recognize that multiple different circuit layouts and electronic components may be used to make the arbitration circuits. The invention is to be understood as not limited by the specific embodiments described herein, but only by the scope of the claims.

We claim:

1. A method, comprising:
    identifying one or more initiating network resources that present a transaction on a first cycle;
    filtering out presented transactions from the arbitration process destined to target network resources that are currently not available to service a transaction;
    implementing an arbitration process among the remaining presented transactions to select a presented transaction from an initiating network resource to an available target network resource that wins the arbitration;
    configuring segments of the pathways in an interconnect in the next cycle to establish a connection between the initiating network resource and the available target network resource that won the arbitration; and
    configuring the segments of the pathways in the interconnect to pass a payload of information from the initiating network resource to the available target network resource while isolating other segments of the pathways in the interconnect not part of the payload of information transfer between the initiator network resource and the available target network resource.

2. The method of claim 1, further comprising:
    determining a destination associated with a target network resource for each presented transaction.

3. The method of claim 1, further comprising:
    cross-referencing the presented transactions from the one or more initiating network resources with target network resources that are currently not available to service a transaction.

4. The method of claim 1, further comprising:
sending control signals to control flip flops to configure segmentation of the pathways in the interconnect so that the control flip flops store the control information resulting from the arbitration process.

5. A method, comprising:
identifying one or more initiating network resources that present a transaction on a first cycle;
filtering out presented transactions from the arbitration process destined to target network resources that are currently not available to service a transaction;
implementing an arbitration process among the remaining presented transactions to select a presented transaction from an initiating network resource to an available target network resource that wins the arbitration;
configuring segments of the pathways in an interconnect in the next cycle to establish a connection between the initiating network resource and the available target network resource that won the arbitration; and
transitioning voltage levels on the segments of the pathways in the interconnect to communicate the payload of information to the available target network resource in a cycle after the arbitration results are determined.

6. An apparatus, comprising:
means for identifying one or more initiating network resources that present a transaction on a first cycle;
means for filtering out presented transactions from the arbitration process destined to target network resources that are currently not available to service a transaction;
means for implementing an arbitration process among the remaining presented transactions to select a presented transaction from an initiating network resource to an available target network resource that wins the arbitration;
means for configuring segments of the pathways in an interconnect in the next cycle to establish a connection between the initiating network resource and the available target network resource that won the arbitration;
means for sending control signals to control flip flops to configure segmentation of the pathways in the interconnect so that the control flip flops store the control information resulting from the arbitration process; and
means for configuring the segments of the pathways in the interconnect to pass a payload of information from the initiating network resource to the available target network resource while isolating other segments of the pathways in the interconnect not part of the payload of information transfer between the initiator network resource and the available target network resource.

7. The apparatus of claim 6, further comprising:
means for transitioning voltage levels on the segments of the pathways in the interconnect to communicate the payload of information to the available target network resource in a cycle after the arbitration results are determined.

8. An interconnect coupled to a plurality of initiator network resources as well as a plurality of target network resources, wherein the interconnect comprises:
a first stage of circuitry to receive incoming transactions from the plurality of initiator network resources and to route an incoming payload of information to a central point;
a second stage of circuitry to pass outgoing transactions to the plurality of target network resources connecting to the interconnect and to route the payload of information from the central point; and
an arbitration controller to arbitrate transactions from the plurality of initiator network resources destined to one or more of the target network resources, wherein the target network resources supply their availability to service a transaction to the arbitration controller, and the arbitration controller to implement an arbitration policy that filters out transactions from an arbitration process those transactions from initiator network resources destined to target network resources that are currently not available to service a transaction.

9. The interconnect of claim 8, wherein the arbitration controller to generate results of the arbitration policy in a first cycle and the first stage of circuitry and the second stage of circuitry are configured to pass a transaction between a first initiator network resource and a first available-target network resource on a second cycle.

10. The interconnect of claim 8, further comprises:
a plurality of segmented pathways within the interconnect, wherein each segmented pathway is independently controllable to pass information from the initiating network resource to the available target network resource while isolating other segments of the pathways in the interconnect not part of the information transfer between the initiating network resource and the available target network-resource.

11. The interconnect of claim 8, wherein a first initiator network resource may be an Intellectual Property core on a system on a chip.

12. A machine-readable medium having stored thereon information representing the apparatus of claim 8.

13. The interconnect of claim 8, wherein the first stage of circuitry and the second stage of circuitry are configured to receive results of the arbitration policy and to transfer a transaction between a first initiator network to a first available-target network resource in a same cycle.

14. An interconnect coupled to a plurality of initiator network resources as well as a plurality of target network resources, wherein the interconnect comprises:
circuitry to receive transactions from the plurality of initiator network resources, wherein the circuitry to receive transactions includes one or more filter units and one or more splitter units to configure segmented pathways in the interconnect; and
an arbitration controller to generate control signals for the filter units and the splitter units to configure a connection pathway in the interconnect between a first initiator network resource and a first target network resource, wherein the configured connection pathway to allow an information transfer between the initiator network-resource and the target network-resource while isolating other segments of the pathways in the interconnect not part of the information transfer between the first initiator network resource and the first target network-resource.

15. The apparatus of claim 14, wherein the circuitry to receive transactions further comprises:
a first stage of circuitry to receive incoming transactions from the plurality of initiator network resources and the first stage includes at least one or more of the filter units to configure segmented pathways in the interconnect; and
a second stage of circuitry to pass outgoing transactions to target network resources connecting to the interconnect and the first stage includes at least one or more of the splitter units to configure segmented pathways in the interconnect.

16. The apparatus of claim 14, wherein the arbitration controller to implement the arbitration process in an initial cycle while the first stage of circuitry to receive transactions to allow the information transfer to occur in another cycle.

17. The apparatus of claim 14, wherein the circuitry to receive transactions further comprises one or more merge units, a first control flip flop coupled to a first splitter unit, and a second control flip flop coupled to a first filter unit.

18. The apparatus of claim 14, wherein the arbitration controller to implement an arbitration policy that filters out transactions from the arbitration process serviced by a target network resource when the target network resource is not ready to service transactions.

19. The apparatus of claim 14, wherein the apparatus of claim 18 is located in a system on a chip.

20. A machine-readable medium having stored thereon information representing the apparatus of claim 14.

21. The apparatus of claim 16, wherein the arbitration controller to implement the arbitration process in an initial cycle while the first stage of circuitry to receive transactions to allow the information transfer to occur in another cycle to increase the maximum operating clock speed of the apparatus.

* * * * *